(12) United States Patent
Litchmanov

(10) Patent No.: US 7,817,155 B2
(45) Date of Patent: Oct. 19, 2010

(54) MASTER/SLAVE GRAPHICS ADAPTER ARRANGEMENT

(75) Inventor: Iouri Litchmanov, Richmond Hill (CA)

(73) Assignee: ATI Technologies Inc.

( * ) Notice: Subject to any disclaimer, the term of this patent is extended or adjusted under 35 U.S.C. 154(b) by 834 days.

(21) Appl. No.: 11/136,483

(22) Filed: May 24, 2005

(65) Prior Publication Data

US 2006/0267987 A1    Nov. 30, 2006

(51) Int. Cl.
G06F 15/16    (2006.01)
G06T 1/20     (2006.01)

(52) U.S. Cl. ..................................... 345/504

(58) Field of Classification Search ................. 345/504, 345/1.1, 506
See application file for complete search history.

(56) References Cited

U.S. PATENT DOCUMENTS

| | | | | |
|---|---|---|---|---|
| 5,485,562 A | * | 1/1996 | Narayanaswami | .......... 345/628 |
| 5,488,385 A | * | 1/1996 | Singhal et al. | ............... 345/3.1 |
| 5,712,664 A | * | 1/1998 | Reddy | ......................... 345/519 |
| 5,825,336 A | * | 10/1998 | Fujita et al. | ................... 345/2.3 |
| 5,949,437 A | | 9/1999 | Clark | |
| 6,018,340 A | | 1/2000 | Butler et al. | |
| 6,046,709 A | * | 4/2000 | Shelton et al. | ................ 345/1.1 |
| 6,104,414 A | * | 8/2000 | Odryna et al. | ............... 345/536 |
| 6,208,361 B1 | * | 3/2001 | Gossett | ........................ 345/536 |
| 6,573,913 B1 | | 6/2003 | Butler et al. | |
| 6,700,580 B2 | * | 3/2004 | Lefebvre et al. | ............. 345/506 |
| 2003/0158886 A1 | * | 8/2003 | Walls et al. | .................. 709/201 |
| 2003/0189571 A1 | * | 10/2003 | MacInnis et al. | ............. 345/505 |
| 2003/0229748 A1 | * | 12/2003 | Brewer et al. | ................ 710/305 |

* cited by examiner

Primary Examiner—Jeffery A Brier

(57) ABSTRACT

A computing device includes first and second graphics adapters. A graphics processor of the first graphics adapter acts as a master graphics processor, while a second graphics adapter acts as a slave. The master graphics processor renders graphics to be displayed on multiple separate displays within memory of the first graphics adapter. Images to be displayed on one of the displays are transferred to memory used by the second graphics adapter. The display interface of the second graphics adapter presents images within the memory of the second graphics adapter on at least one of the multiple displays. In this way, device electronics forming the display interface, as well as ports of the second adapter, acting as a slave, may be utilized. In one embodiment, an application creates a single larger image, rendered within the memory of the first graphics adapter. The larger image is then presented as the first and second smaller images on the multiple displays. In this way, an end user sees the multiple images as a single large image across the multiple displays.

21 Claims, 7 Drawing Sheets

MASTER/SLAVE GRAPHICS ADAPTER ARRANGEMENT

FIELD OF THE INVENTION

The present invention relates generally to computing devices, and more particularly to a computing device including two graphics adapters, acting as master and slave, and related methods.

BACKGROUND OF THE INVENTION

In recent years, computer hardware has become increasingly integrated. Computer peripherals are often formed as part of an integrated chipset that cooperates with a central processor. Often, computer audio, graphics adapters and interfaces form part of the integrated chipsets. Such integration reduces costs and size of the computing devices.

At the same time, graphics processors are steadily evolving to provide enhanced performance and features. Leading graphics processors are nearly as complex as central processors. Thus, despite trends in integration, high performance graphics processors are still typically formed on peripheral cards. Integrated graphics processors, are by comparison, relatively simple and do not provide the features or performance of the high performance, graphics processors formed on peripheral cards. In the presence of an add-on peripheral card, integrated graphics components when present, are typically redundant and therefore disabled.

Similarly, as graphics adapters, whether integrated or external, are upgraded there is often no role for less powerful adapters, and these are disposed of or disabled.

Accordingly, there remains a need to effectively combine multiple graphics adapters, and particularly those formed as integrated chipsets and peripheral cards.

SUMMARY OF THE INVENTION

In accordance with the present invention, a computing device includes first and second graphics adapters. A graphics processor of the first graphics adapter acts as a master graphics processor, while a second graphics adapter acts as a slave. The master graphics processor renders graphics to be displayed on multiple separate displays within memory of the first graphics adapter. Images to be displayed on one of the displays are transferred to memory used by the second graphics adapter. The display interface of the second graphics adapter is used to present images within the memory of the second graphics adapter on at least one of the multiple displays. In this way, device electronics forming the display interface, as well as ports of the second adapter, acting as a slave, may be utilized.

In one embodiment, an application creates a single larger image that is rendered within the memory of the first graphics adapter. The larger image is then presented as the first and second smaller images on the multiple displays. In this way, an end user sees the multiple images as a single large image across the multiple displays.

In accordance with an aspect of the present invention, a graphics processor forming part of a first graphics adapter is operated to draw first and second images on first and second displays, respectively. The first display is interconnected with a first display interface of the first graphics adapter. The second display is interconnected with a second display interface of a second graphics adapter. The method comprising rendering the first and second images within memory of the first graphics adapter; transferring the second images from the memory of the first adapter to a frame buffer of the second graphics adapter; and displaying the second images from the frame buffer of the second graphics adapter on the second display, using the second display interface of the second graphics adapter.

In accordance with another aspect of the present invention, a computing device includes: a processor; computer readable memory in communication with the processor; a first graphics adapter; first adapter memory in communication with the first graphics adapter; a first display interface for presenting images on a first display; a second graphics adapter; a second display interface for presenting images on a second display; a high speed bus interconnecting the first and second graphics adapters. Program code is stored within the computer readable memory, and is executable by the processor. The program code when executed, causes the first graphics adapter to render first and second images within the first adapter memory; causes transfer of the second images from the first adapter memory to a frame buffer of the second graphics adapter; and causes the second display interface of the second graphics adapter to be programmed to display the second images from the frame buffer of the second graphics adapter on the second display.

In accordance with another aspect of the present invention, there is provided a method of operating a first graphics processor to draw first and second images on first and second displays, respectively. The second display is interconnected with a display interface of a second graphics adapter. The method includes rendering the first and second images within memory in communication with the first graphics processor; transferring the second images to a frame buffer of the second graphics adapter; and programming the display interface of the second graphics adapter to display the second images from the frame buffer of the second graphics adapter on the second display.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
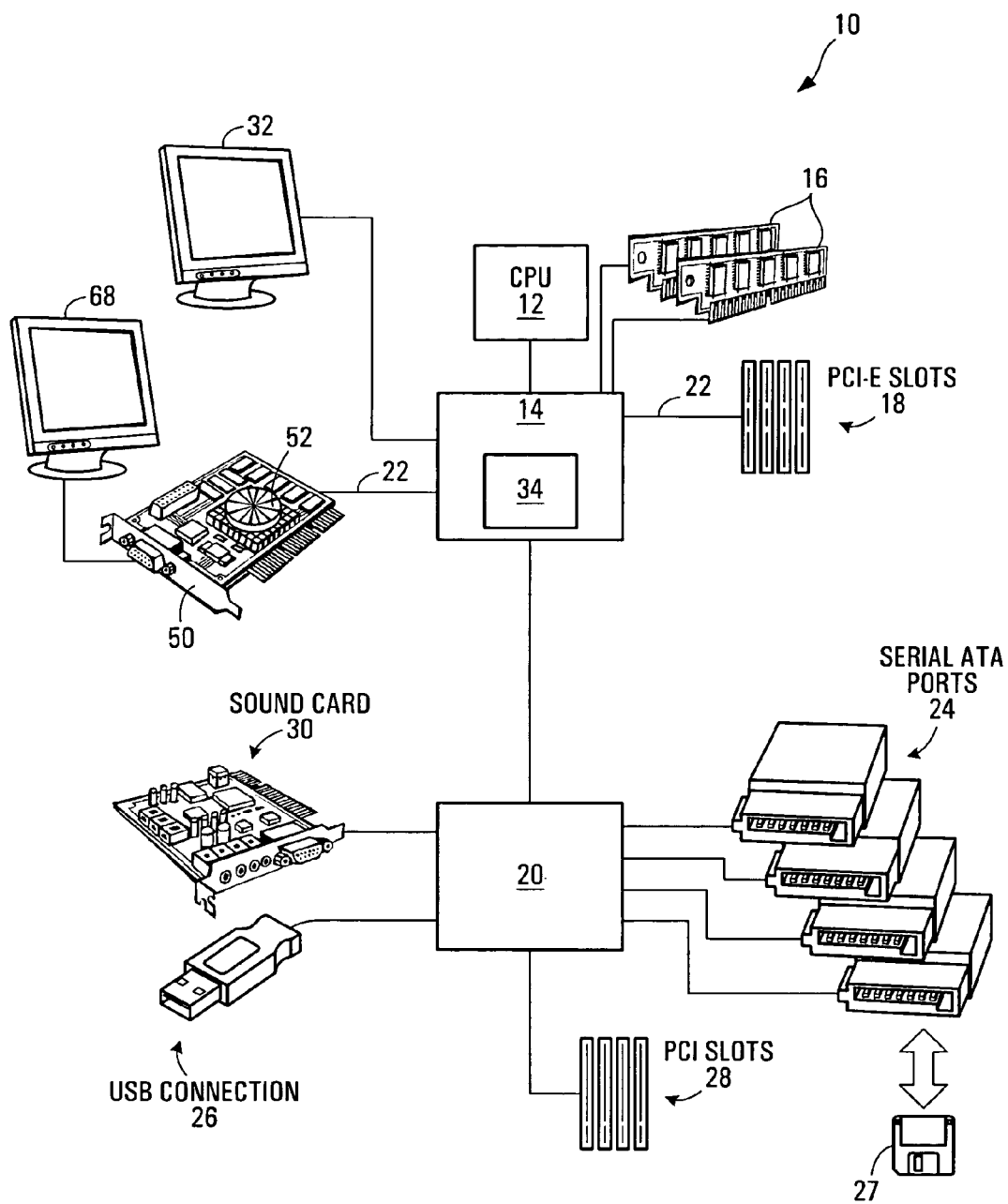
FIG. 1 is a simplified block diagram of a computing device, exemplary of an embodiment of the present invention.

FIG. 1 is a simplified schematic block diagram of a computing device exemplary of an embodiment of the present invention. Computing device 10 is based on a conventional Intel x86 architecture. However, as will become apparent, the invention may easily be embodied in computing devices having a PowerPC or other architecture.

Computing device 10 includes a processor 12, interconnected to system memory 16 and peripherals through integrated interface circuits 14 and 20.

Processor 12 in exemplary computing device 10 is a conventional central processing unit and may for example be a microprocessor compatible with the INTEL™ x86 family of microprocessors.

Integrated interface circuits 14 and 20 are often referred to as a north bridge and south bridge, respectively, and provide an interface for processor 12 to peripherals and memory. As illustrated, north bridge 14 interconnects the processor 12; memory 16; a plurality of expansion slots 18 by way of a high speed expansion bus 22; and south bridge 20. South bridge 20 in turn, interconnects lower speed peripherals and interconnects, such as disk drives by way of integrated IDE/SATA ports 24, universal serial bus devices by way of integrated universal serial bus (USB) ports 26; and other peripherals by way of a lower speed expansion bus 28, compliant for example, with known PCI or ISA standards. South bridge 20 may further include integrated audio components 30, networking interfaces (not shown) and the like.

An exemplary expansion bus 22 is the PCI express (PCIe) bus, that has a bandwidth in the gigabyte per second range, and allows data transfer reads and writes at this bandwidth. For example, current PCIe bus speeds allow bi-directional data transfer at speeds of up to 266 MHz or 533 MHz, allowing data rates of up to 2.1 G bytes per second or 4.2 G bytes per second.

In the depicted embodiment north bridge 14 further includes an integrated graphics adapter 34 suitable for interconnecting computing device 10 to a first display 32 in the form of a monitor, LCD panel, television or the like.

As detailed below, an additional graphics adapter 52 forming part of peripheral expansion card 50 within expansion slots 18 on expansion bus 22 may further be part of computing device 10.

Figure 2:
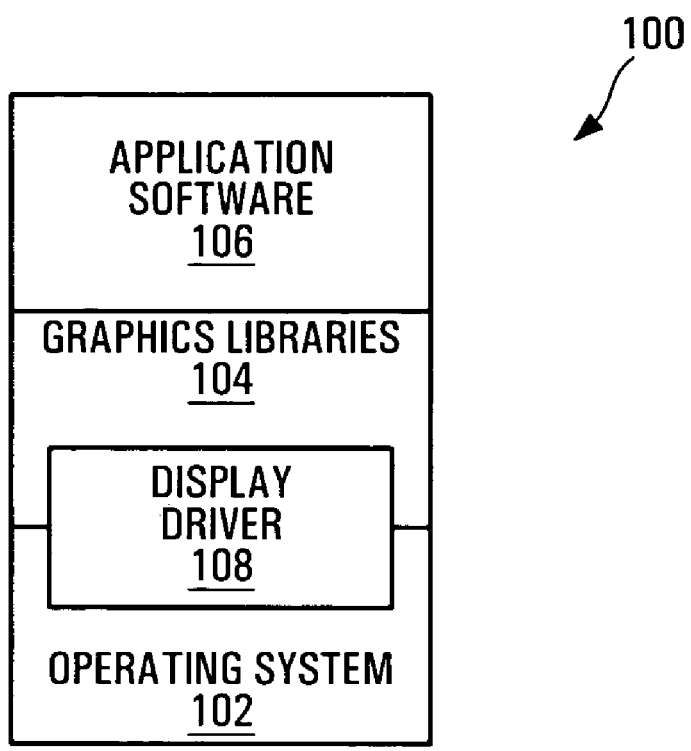
FIG. 2 is a simplified logical block diagram of software at the computing device of FIG. 1.

In the depicted embodiment, computing device 10 executes software stored within memory 16. As illustrated in FIG. 2, exemplary software 100 includes an operation system 102, graphics libraries 104 and application software 106, stored within memory 16. Exemplary operating systems include Windows XP; Windows NT 4.0, Windows ME; Windows 98, Windows 2000, Windows 95, or Linux operating systems. Exemplary graphics libraries include the Microsoft DirectX libraries and the OpenGL libraries. Computer memory 16 (FIG. 1) and interconnected disk drives (not shown) include a suitable combination of random access memory, read-only memory and disk storage memory, used by device 10 to store and execute operating system and graphics adapter driver programs adapting device 10 in manners exemplary of the embodiments of the present invention. Exemplary software 100 (FIG. 2) could, for example, be stored in read-only memory or loaded from an external peripheral such as a disk drive in communication with IDE/SATA ports 24. Computer readable medium 27 may be an optical storage medium, a magnetic diskette, tape, ROM cartridge or the like.

Graphics libraries 104 or operating system 102 further include a graphics driver software 108, used for low-level communication with graphics adapters 34 and 52. The software is layered, with higher level layers using lower layers to provide certain functionality. Applications may make use of the operating system 102 and graphics libraries 104 to render 2D or 3D graphics. Render, in this context, includes drawing, or otherwise creating a graphic image for presentation, and may for example include polygon rendering, ray-tracing, image decoding, line drawing or the like. As will become, apparent, software exemplary of embodiments of the present invention may form part of graphics libraries 104 and/or driver software 108. In the exemplified embodiment, exemplary software may form part of the OpenGL library and associated drivers. OpenGL is more particularly detailed in The Official Guide to Learning OpenGL, Version 1.1, the contents of which are hereby incorporated by reference. A person of ordinary skill will, however, appreciate that methods exemplary of embodiments of the present invention may form part of Microsoft Direct3D libraries, applications (such as games) that do not use custom libraries or routine, or any other 3D application or library.

Figure 3:
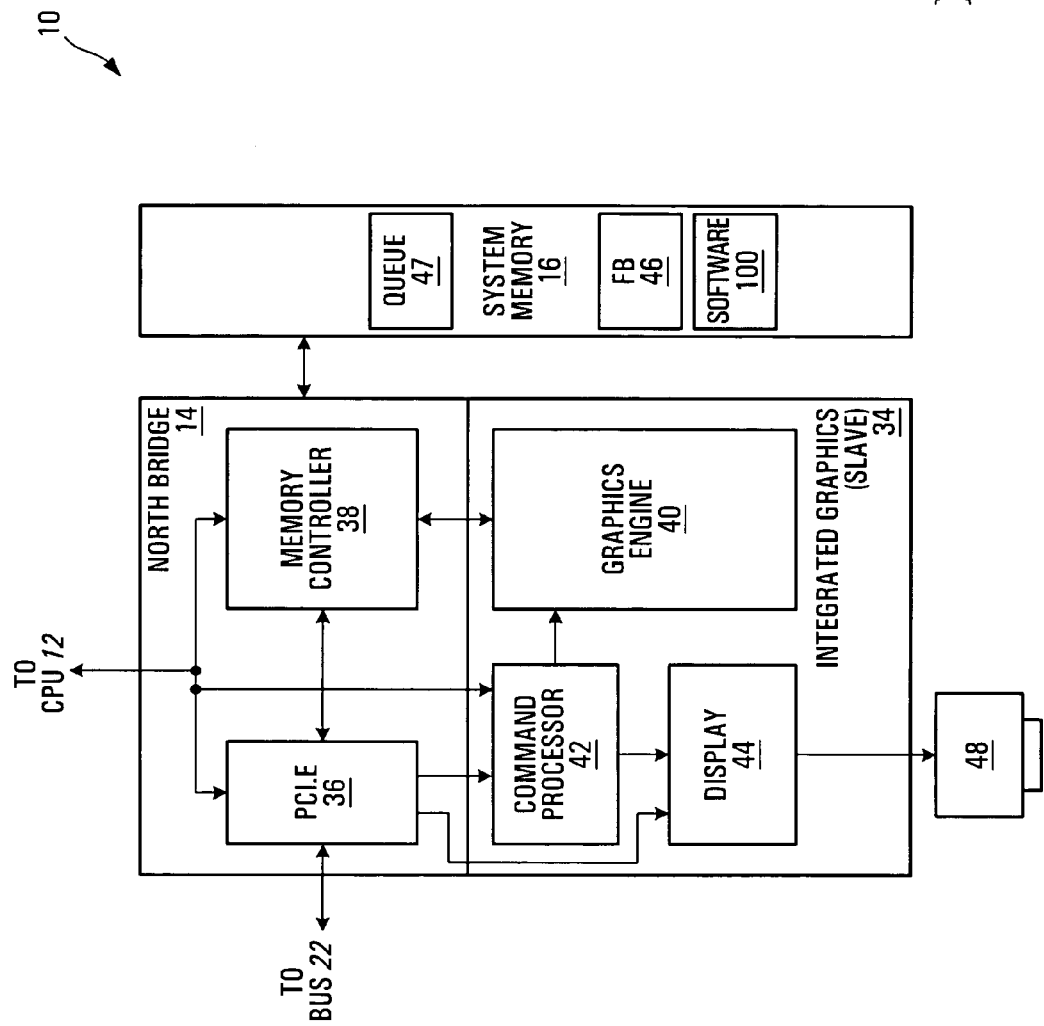
FIG. 3 is a simplified block diagram of a portion of the computing device of FIG. 1.

A further simplified block diagram of portions of exemplary computing device 10 (and particularly north bridge 14) depicting integrated graphics adapter 34 is illustrated in FIG. 3. As illustrated, north bridge 14 includes a high speed bus interface 36, and memory controller 38, interconnecting bridge 14 to expansion bus 22 and system memory 16. North bridge 14 further includes integrated graphics adapter 34, that in turn includes a graphics processor 40, a command processor 42 and a display interface 44.

Graphics processor 40 may take the form of a three dimensional (3D) graphics processor capable of rendering three dimensional images within a frame buffer 46 allocated within system memory 16, and may include multiple pipelines and pipline stages for accelerated rendering of graphics.

In normal, single monitor operation, commands are passed to graphics processor 40 by command processor 42, in a conventional manner. For example, command processor 42 may include registers used to define a command queue 47 in memory 16. Application software 106 or operating system 102 uses libraries 104 to render graphics images. Driver software 108 generates graphics processor specific commands, and places these in the command queue 47, while also updating registers of command processor 42 to reflect the end of the queue. Graphics processor 42 processes queued commands asynchronously, in a pipelined manner in order to, among other things, render images within frame buffer 46. As graphics processor 40 is able to process the next command in the queue, it provides a signal to command processor 42, which in turn fetches the next command in the queue 47 and advances the queue pointer in registers of command processor 42.

Display interface 44, by way of memory controller 38 samples the frame buffer 46 and presents an image on one or more video output ports 48 in the form of VGA ports; composite video ports; DVI ports, or the like, for display of one or more video images on video devices such as display 32 (FIG. 1), in the form of a television, monitor or the like. In this way, images rendered by graphics processor 40 in frame buffer 46 may be presented.

As will be appreciated display interface 44 may be any suitable interface for converting data within buffer for display on a display device. For example, display interface 44 may take the form of a RAMDAC. Display interface 44 is typically programmable, for example through a plurality of registers, allowing driver software 108 or similar software or graphics processor 40 to set the beginning address within memory 16 to present at its display output. As well, interface 44 pixel depth (i.e. bits per pixel) and screen resolution are typically programmable.

As will be appreciated, instead of allocating a single frame buffer 46 within memory 16, two frame buffers may be allocated. The buffers may be used alternatively to more smoothly present rendered graphics. Display interface 44 only displays contents of one of the two buffers at any time. The buffer being displayed is typically referred to as the front buffer. Graphics processor 40 renders images for display to the so-called back buffer the frame buffer that is currently not being displayed by display interface 44. At the completion of rendering a frame, front and back buffers are flipped: display interface 44 is programmed to present the former back buffer. In this way, transition between sequential frames rendered by graphics processor 40 may appear smooth.

Notably, registers and frame buffer memory 46 used by adapter 34 are all mapped to addresses within global memory space.

Figure 4:
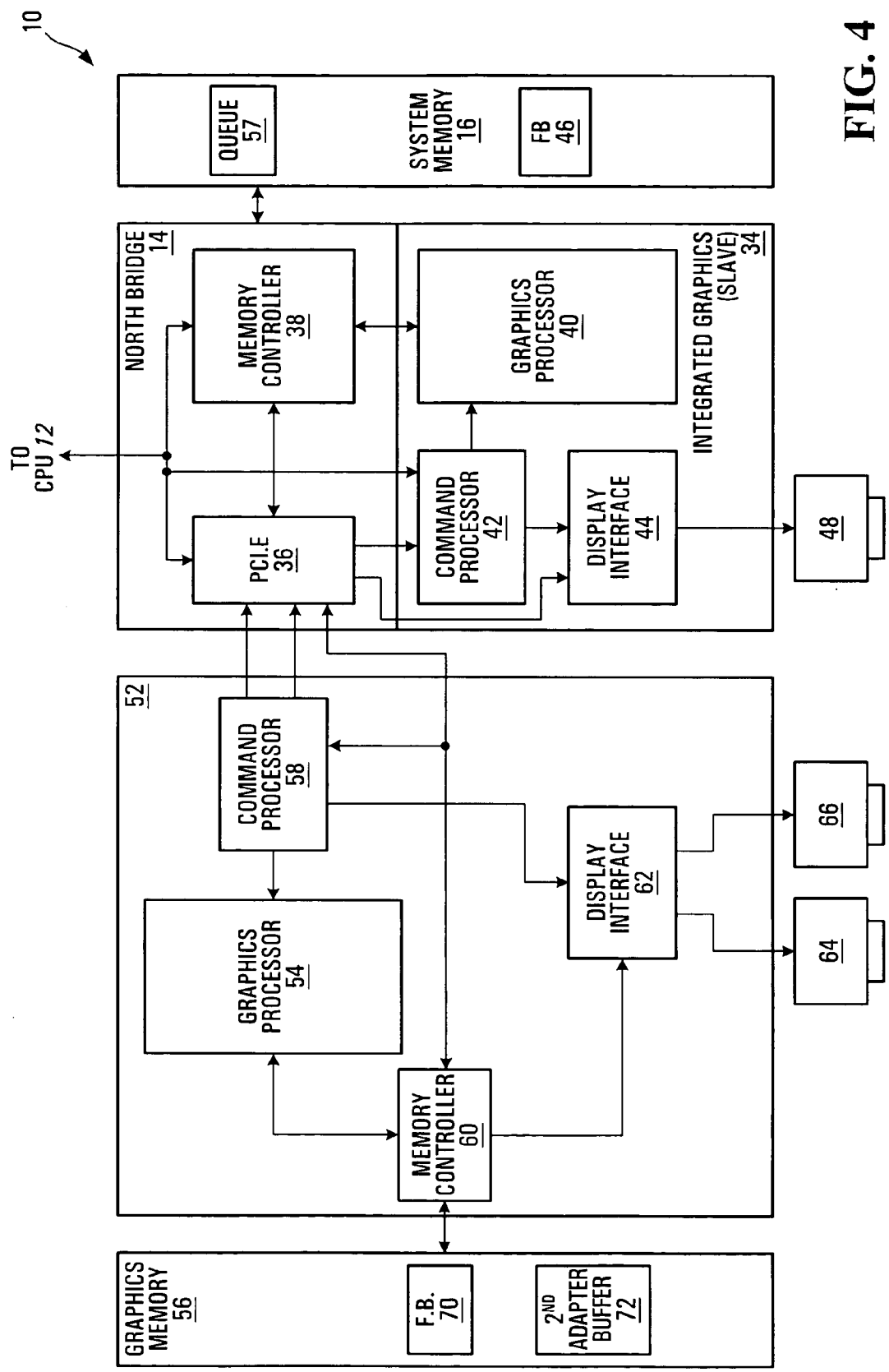
FIG. 4 is a further schematic block diagram of a portion of the computing device of FIG. 1.

Exemplary of the present invention, however, computing device 10 further includes a graphics adapter 52 formed on a peripheral expansion card 50 that may be inserted into device 10 by way of an expansion slot on high speed expansion bus 22, in communication with north bridge 14, as illustrated in FIG. 1. Graphics adapter 52, as interconnected to north bridge 14, is schematically illustrated in FIG. 4. As illustrated, graphics adapter 52 includes a graphics processor 54, video memory 56, a command processor 58 a memory controller 60, and a display interface 62. One or more ports 64, 66 allow interconnection of adapter 52 to one or more display devices, like display 68 (FIG. 1).

Command processor 58, and display interface 62 function in much the same way as command processor 42 and display interface 44, respectively. Graphics processor 54 operates in much the same way as graphics processor 40, in its normal mode of operation. Graphics adapter 52 includes its own memory 56, and a memory controller 60 to provide access to memory 56 and system memory 16. Local memory 56 is used to hold, among other things, one or more frame buffer(s) 70 for graphics adapter 52 used by graphics processor 54. A command queue 57 for graphics processor 54 is also established in system memory 16.

Again, local memory 56 is addressable at addresses within global system memory space, through memory controller 60. As well, registers used by command processor 54 and display interface 62 are addressable at addresses within global address space. As already noted, registers and frame buffer 46 used by adapter 34 are mapped to global memory space. Thus, command processor 58 and graphics processor 54 may write to frame buffer 46 and registers used by display interface 44 and command processor 42.

Additionally, graphics processor 54, in conjunction with memory controller 60 is operable to perform block transfer operations to transfer data from and to system and adapter memory 16, 56 at memory addresses.

In an effort to provide economical integrated components, integrated graphics adapter 34 provides limited functionality. For example, resolution, 3D graphics abilities, and the like of integrated graphics controller are relatively limited. Thus, integrated graphics adapter 34 typically has significantly less graphics processing ability than graphics adapter 52. For example, adapter 34 may operate more slowly than adapter 52, provide less features, and the like.

Now, integrated adapter 34 or adapter 52 may, or may not, by itself allow the interconnection of multiple physical display devices, by way of multiple ports like port 48. Each adapter, however, may be interconnected with at least one physical display. So, exemplary of embodiments of the present invention, adapter driver software 108 loaded within memory 16 causes graphics adapter 52 to act as a master (or first) graphics adapter rendering graphics for presentation at both displays 32 and 68, and graphics adapter 34, as a second or slave adapter.

As will become apparent, in this master/slave mode of operation, integrated graphics adapter 34 is substantially disabled. However, components of on-board graphics adapter 34 (and in particular display interface 44) may still be used to drive interconnected monitors and other display devices. As such, card 50 need not include multiple display ports and display drivers. Instead, display interface 44 and its port(s) 48 may be used to drive at least one monitor or display 32, in addition to the display 68 or displays driven by card 50. If adapter 52 includes multiple ports (such as ports 64, 66), processor 52 may additionally render images for presentation through these multiple ports. Of course, driver software 108 may also allow operation of adapter 34 in its conventional mode of operation, described above. Selection of the mode of operation of adapter 34 (and hence adapter 52) may be made by or through application software 106.

Specifically, in the master/slave mode of operation, exemplary of embodiments of the present invention, driver software 108 within memory 16 allocates an active frame buffer 70 and a secondary adapter frame buffer 72 within memory 56 of adapter 52, as schematically depicted in FIG. 4. The active frame buffer 70 functions as a conventional frame buffer for adapter 52, and thus stores frames for display on display 68 of adapter 52. As such, graphics processor 54 renders 2-D or 3-D graphics in the active frame buffer 70 within memory 56 in a conventional manner. Display interface 62 of card 50 converts contents of the active frame buffer 70 for display on an interconnected monitor or display device. Optionally, active frame buffer 70 may be replaced by front and rear buffers, as described above.

Graphics processor 54 may additionally render images for presentation on another display interconnected with adapter 52, such as for example interconnected with port 64, driven by display interface 62 or another display interface not shown.

Graphics processor 54 further renders images for display on a second display device 32 within secondary adapter frame buffer 72. At the conclusion of rendering a frame within secondary adapter frame buffer 72, the contents of secondary adapter frame buffer 72 are transferred to frame buffer 46 for presentation by display interface 44 of graphics adapter 34, as detailed below.

Figure 5A:
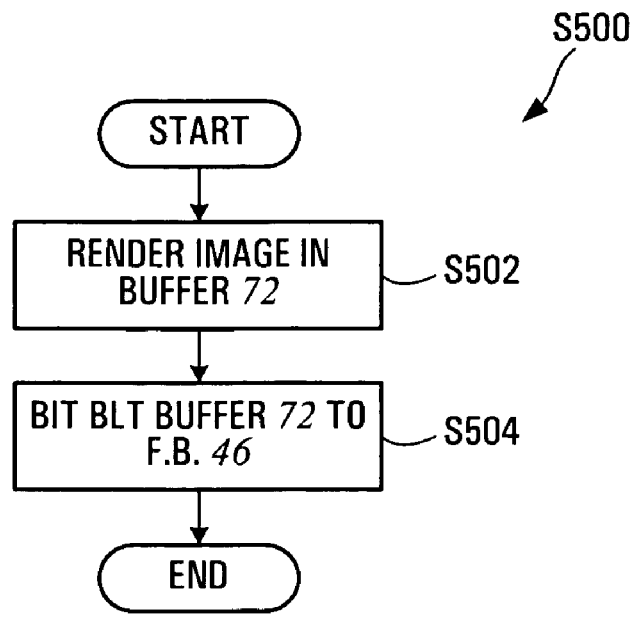
FIG. 5A is a flow chart illustrating steps performed at the computing device of FIG. 1, exemplary of an embodiment of the present invention.

In a first embodiment, graphics adapter driver software 108 within memory 16 performs steps S500 depicted in FIG. 5A. Specifically, driver software 108 generates commands directing graphics processor 54 to render the secondary adapter buffer 72 of memory 56, in steps S502. These commands are placed in the command queue 57 of adapter 52 and executed by graphics processor 54, in much the same way as commands would be queued in queue 47, as described above. Once the frame is rendered, driver software 108 further generates a command (or commands) causing processor 54 to bit block transfer (BITBLT) the contents of secondary adapter frame buffer 72 within memory 56 in step S504, to that area of memory 16 allocated as frame buffer 46 for graphics adapter 34.

Figure 5B:
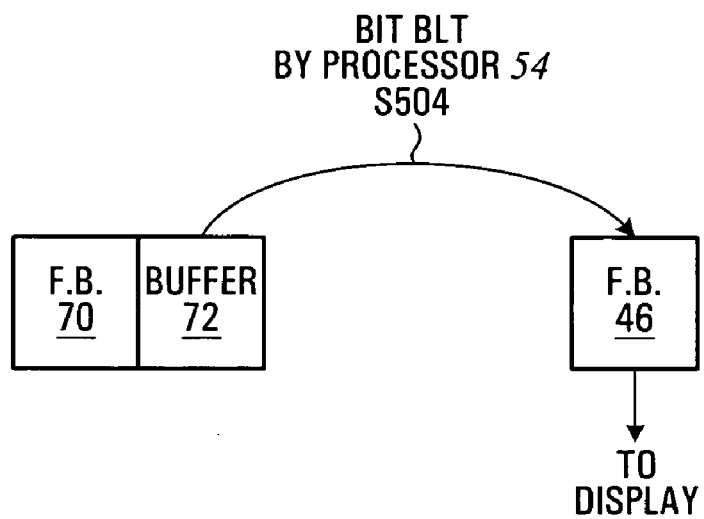
FIG. 5B schematically depicts the effects of steps of FIG. 5A on components of the device of FIG. 1.

Display interface 44 of graphics adapter 34, in turn, has been pre-programmed to display the contents of its frame buffer 46 to an interconnected monitor or display at port 48. Conveniently then, images displayed on displays 32 and 68 interconnected with ports 48 and port 64 are rendered or drawn by graphics processor 54. The effects of step S504 on buffer 72 and frame buffer 46 is illustrated in FIG. 5B.

Of course, steps performed by driver software 108 to cause images to be presented on display 68 are conventional, and thus not detailed in FIG. 5A.

Figure 6A:
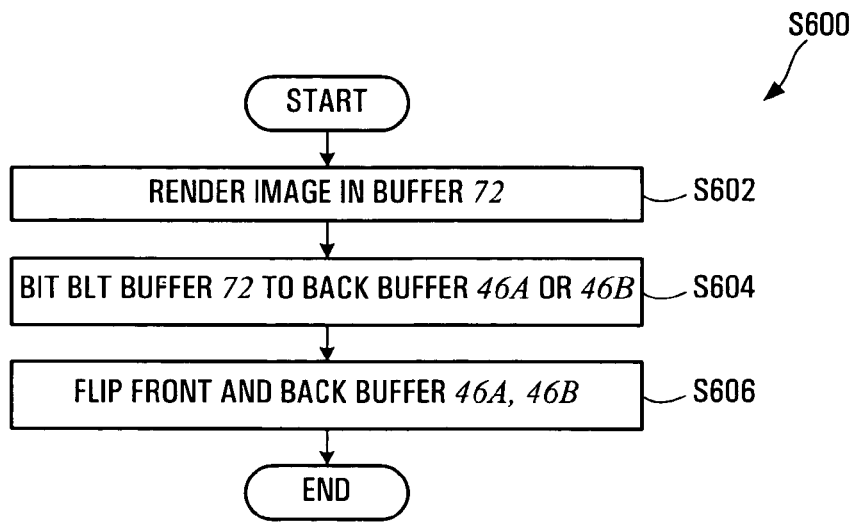
FIG. 6A is a flow chart illustrating steps performed at the computing device of FIG. 1, exemplary of an embodiment of the present invention.

In a second embodiment, steps S600 depicted in FIG. 6A are performed. Initially, front and back frame buffers are allocated within memory 16 of adapter 52. For convenience these are designated as buffers 46a and 46b, and depicted in FIG. 6B. Processor 54 again renders any frame to presented by display interface 44 within secondary adapter frame buffer 72 of memory 56 as described above with reference to step S502, in step S602.

Figure 6B:
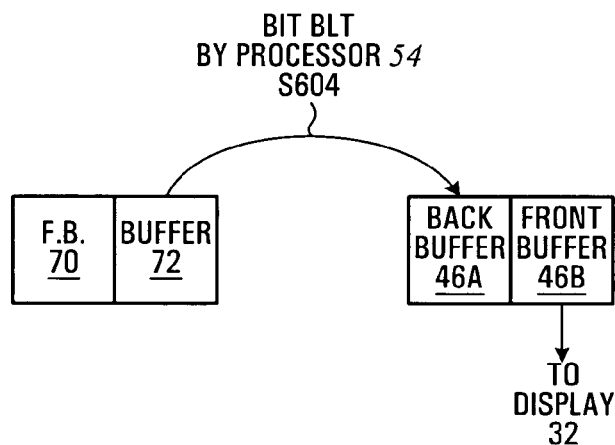
FIGS. 6B and 6C schematically depict the effects of steps of FIG. 6A on components of the device of FIG. 1.
Figure 6C:
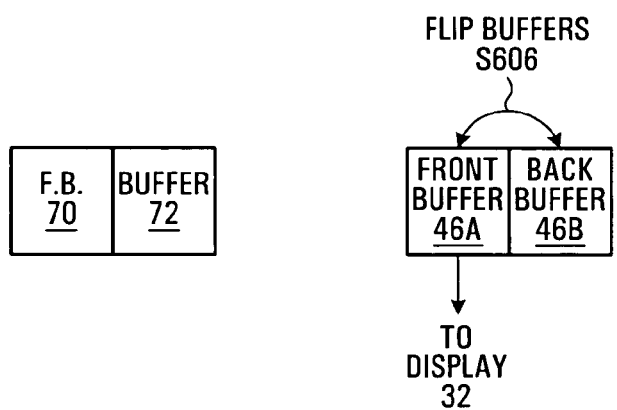

At the conclusion of rendering a frame for display on device 32, driver software 108 programs graphics processor 54 to bit block transfer (BITBLT) the contents of secondary adapter frame buffer 72 within memory 56, to the then current back buffer within memory 16 for graphics adapter 34 in step S604. Upon completion of the BITBLT, driver programs processor 54 to program registers of display interface 44 to flip the back buffer and front buffer of adapter 34 (i.e. use the back buffer as the front buffer), in step S606. This may be done by directly reprogramming the register of display interface 44 identifying the start address used by display interface 44 for presentation of data. Display interface 44 of graphics adapter 34, in turn, presents the contents of it's the buffer to an interconnected monitor (i.e. display 68) at port 48. The previous front buffer, in turn, is now used as back buffer for adapter 34, and the next frame rendered by processor 54 for display on display 32 will initially be transferred to this back buffer in step S604. Driver software 108, of course, maintains the start location and status of each buffers 46a and 46b as front and back buffers. The effect of steps S604 and S606 on buffers 46a and 46b is schematically illustrated in FIG. 6B and FIG. 6C.

Without synchronization, use of a single buffer 46 or direct programming of display interface 44 of adapter 34 may cause visible tearing. That is, any time outside of the vertical blanking interval that registers of display interface 44 are reprogrammed, tearing may be visible, as display parameters are changed in the middle of the frame output by interface 44.

Figure 7:
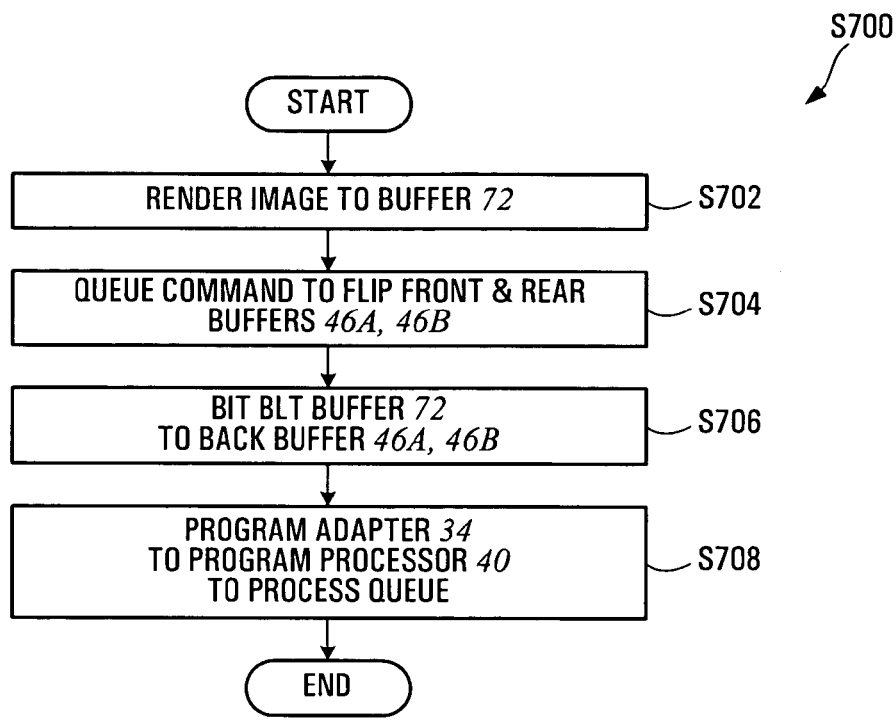
FIGS. 7 and 8 are flow charts illustrating steps performed at the computing device of FIG. 1, exemplary of further embodiments of the present invention.

Thus, in yet a third embodiment, steps S700 depicted in FIG. 7 may be performed. Again, front and rear buffers 46a, 46b are initially allocated within memory 16 used by adapter 34. Processor 54 again renders images for display at device 32 within buffers 72 of local memory 56, as described above with reference to steps S502 and S602.

At the completion of rendering a frame for display on display 32, driver software 108 within memory 16 programs graphics processor 54 to bit block transfer (BITBLT) the contents of secondary adapter frame buffer 72 within memory 56, to the then current back buffer within memory 16 of graphics adapter 34 in step S704. Driver software 108 further places a command in the command queue 47 of adapter 34 to flip front and back buffers, in step S706. However, registers of command processor 42 are not updated by driver software 108 to reflect the pending command in command queue 47. Instead, driver software 108 provides a command to graphics processor 54 in step S708 to update command queue registers of command processor 42 upon completion of the bit block transfer initiated in step S706. This, in turn causes command processor 42 to provide instructions to processor 40 to flip its back to front buffer. Graphics processor 40, in turn executes the queued command to flip back and front buffers of adapter 34 (i.e. by reprogramming registers of display interface 44 to present the contents of its previous back buffer to an interconnected monitor or display at port 48).

Figure 8:
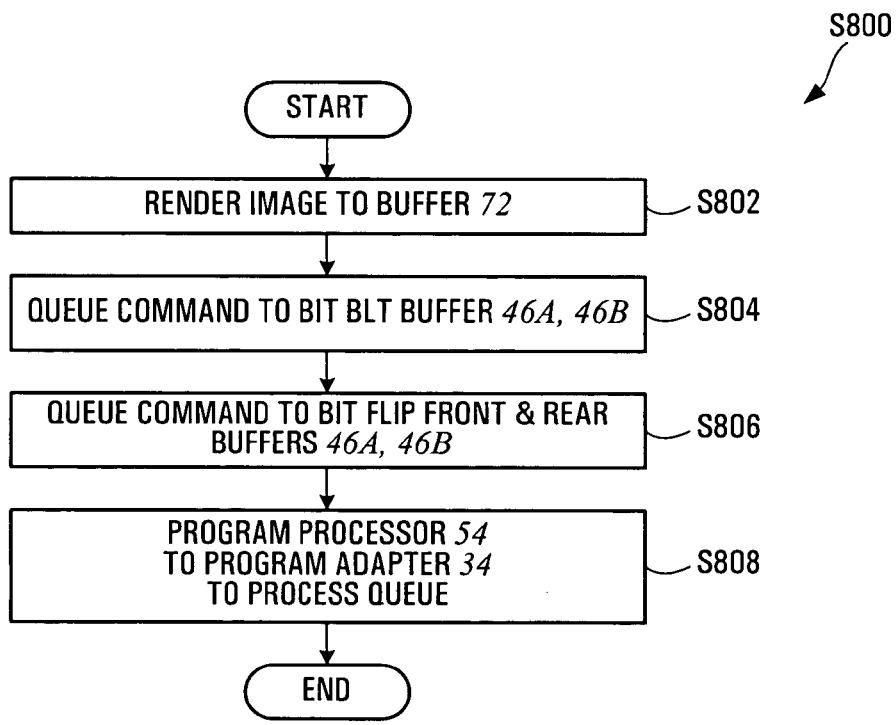

In yet a fourth embodiment, steps S800 depicted in FIG. 8 are performed. Again, front and rear buffers are initially allocated within memory 16 of adapter 34. Processor 54 again renders images for display 32 within buffer 72 of local memory 56, as described above.

Driver software 108 further places a command in queue 47 of adapter 34 to cause graphics processor 40 to bit block transfer (BITBLT) the contents of the secondary frame buffer 72 within memory 56, to that area of system memory 16 allocated as the current rear frame buffer for graphics adapter 34. Driver software 108 also places a command in queue 47 to cause graphics processor 40 to flip front and rear buffers of adapter 34 by programming display interface 44 to use the rear buffer as front buffer. However, registers of command processor 42 defining the queue pointer are not updated until a frame has been rendered in buffer 72.

So, at the conclusion of rendering a frame for display 32, graphics processor 54 provides a command to update command registers defining the queue pointer for command processor 42 to reflect the two pending commands within the command queue of adapter 34. Graphics processor 40, in turn executes the queued commands to bit block transfer the contents of buffer 72 to its back buffer and flip its back and front buffers (i.e. by reprogramming registers of display interface 44 to present the contents of its previous back buffer to an interconnected monitor or display at port 48).

As will now be appreciated, the embodiments depicted in FIGS. 7 and 8 rely on the internal queues and asynchronous processing of commands by graphics processors 40 and 54, thus at partially offloading flow control from driver software 108 to processor 54 or 40. Further, use of processor 54 to update registers of display interface 44 ensures these are programmed during a vertical blanking interval, thus eliminating or reducing visible tearing.

As will now be appreciated, the above described embodiments allow a master graphics processor to assume responsibility for drawing two or three dimensional graphics images on multiple independent frame buffers. A slave graphics adapter may be used to display images created in the one frame buffer. Device electronics and ports required to drive additional displays may be provided by slave graphics adapter 34. In this way, electronics included in the slave graphics controller may be effectively utilized to allow driving of multiple displays.

Conveniently, buffers 70 and 72 may be used to define a single surface on which application software 106 may render single graphic images to be displayed across two or more displays 48 and 64, interconnected with graphics adapters 52 and 34. Driver software 108 may accordingly report an available screen size to application software 106, equal to the size of buffer 70 and buffer 72. Thus, if buffer 70 has a resolution of $m_1 x n$ and buffer 72 has a resolution of $m_2 x n$, driver software 108 may report an available screen size of $(m_1 + m_2) x n$ to an application of application software 106. Rendering by driver software 108 is simplified if buffers 70 and 72 occupy contiguous $(m_1 + m_2) x n$ pixel locations within memory 56. Application software 106 may, in turn use driver software 108 to cause graphics processor 40 to render larger images having a resolution of $(m_1 + m_2) x n$ pixels making up the surface defined by buffers 70 and 72. Buffers 70 and 72 thus store image pairs, with each image of the pair forming a portion of the larger image rendered by the application. At the conclusion of rendering each larger image, driver software 108 may transfer the image in buffer 72 to frame buffer 46, for display on display 32, in accordance with steps S500, S600, S700 or S800 described above. The image in buffer 70 may be displayed on display 68 in normal fashion. An end user viewing displays 32 and 68 side by side recognizes the larger image rendered by application 106. As will be appreciated, application 106 in the form of a game may take advantage of multiple displays, without requiring modification.

If front and back buffers are used for display 68, two different buffers may be allocated and used in place of buffer 72, to ensure that the buffer holding the surface portion to be displayed on display 32 is adjacent in memory 56 to the buffer in which the surface portion to be displayed on display 68 is being rendered. Steps S602, S604, S702, S704, or steps S802, S704 could accordingly be modified to bit block transfer the buffer holding the just completed image to the back buffer 46a or 46b. Conveniently, existing application software 106 need not be modified. Instead, the application software may simply rely on the reported larger screen size. Driver software 108 causes the rendering of surfaces across multiple displays.

As will now also be appreciated, although the depicted embodiment utilizes an integrated graphics controller as a slave graphics adapter, the slave graphics adapter could easily be another graphics adapter in communication with graphics adapter 52 by way of a bus having sufficient bandwidth to allow transfer of graphics frames into the slave frame buffer (s). As such, the slave graphics processor could be formed as another PCIe compliant expansion card. So, for example, as graphics cards are upgraded, older expansion cards may still be used for their ability to drive interconnected displays. Similarly, the expansion bus need not be a PCIe expansion bus, but could be any other suitable bus having a bandwidth allowing transfer of data between frame buffers at a rate equal to the refresh rate used by display interface 44. Likewise, although frame buffers 46 (and front and back buffers 46a and 46b) have been described as being formed in system memory 16, they could easily be formed as part of memory local to adapter 34.

Of course, the above described embodiments are intended to be illustrative only and in no way limiting. The described embodiments of carrying out the invention are susceptible to many modifications of form, arrangement of parts, details and order of operation. For example, the invention could be implemented on computing devices having hardware architectures vastly different from those described. Described software portions, may be organized in different ways. Bandwidth permitting, the described method could be used to allow a single graphics adapter to render images for display by two or more adapters acting as slaves. Many other modifications are possible. Rather, the invention is intended to encompass all such modification within its scope, as defined by the claims.

What is claimed is:

1. A method of operating a graphics processor forming part of a first graphics adapter to draw first and second images on first and second displays, respectively, said first display interconnected with a first display interface of said first graphics adapter, said second display interconnected with a second display interface of a second graphics adapter, said method comprising:
   rendering said first and second images within memory of said first graphics adapter;
   transferring said second images from said memory of said first adapter to a frame buffer of said second graphics adapter; and
   displaying said second images from said frame buffer of said second graphics adapter on said second display, using said second display interface of said second graphics adapter.

2. The method of claim 1, wherein said displaying comprises programming said second display interface to display images from said frame buffer of said second adapter.

3. The method of claim 1, wherein said transferring comprises programming said graphics processor of said first graphics adapter to transfer said rendered second images to said frame buffer of said second graphics adapter.

4. The method of claim 1, wherein said frame buffer of said second graphics adapter comprises a back buffer, and wherein said transferring comprises programming said graphics processor of said first graphics adapter to transfer said rendered second images to said back buffer.

5. The method of claim 1, wherein said transferring comprises programming a graphics processor of said second graphics adapter to transfer said rendered second images to said frame buffer of said second graphics adapter.

6. The method of claim 1, wherein said frame buffer of said second graphics adapter comprises a back buffer, and wherein said transferring comprises programming said graphics processor of said first graphics adapter to transfer said rendered second images to said back buffer.

7. The method of claim 1, wherein said transferring comprises transferring said second images by way of a high speed peripheral bus.

8. The method of claim 1, wherein said transferring comprises placing a command for execution by a second graphics processor of said second graphics adapter in a command queue for said second graphics processor.

9. The method of claim 5, wherein said programming comprises placing a command for execution by said second graphics processor in a command queue for said second graphics processor.

10. The method of claim 1, wherein said first and second images form single larger images rendered by an application.

11. The method of claim 9, wherein said first and second images are rendered in contiguous memory locations.

12. The method of claim 11, wherein said first image has resolution of $m_1 \times n$ pixels, said second image has a resolution of $m_2 \times n$ pixels, and said larger image has a resolution of $(m_1+m_2) \times n$ pixels.

13. A computer readable medium, storing computer executable instructions that when loaded at a computing device comprising first and second graphics adapters, a graphics processor forming part of said first graphics adapter, a first display interconnected with a first display interface of said first graphics adapter, a second display interconnected with a second display interface of said second graphics adapter, adapt said graphics processor to draw first and second images on said first and second displays, respectively, by:
   rendering said first and second images within memory of said first graphics adapter;
   transferring said second images from said memory of said first adapter to a frame buffer of said second graphics adapter; and
   displaying said second images from said frame buffer of said second graphics adapter on said second display, using said second display interface of said second graphics adapter.

14. A computing device comprising:
   a processor;
   computer readable memory in communication with said processor,
   a first graphics adapter;
   first adapter memory in communication with said first graphics adapter;
   a first display interface for presenting images on a first display;

a second graphics adapter;

a second display interface for presenting images on a second display;

a high speed bus interconnecting said first and second graphics adapters;

program code stored within said computer readable memory, executable by said processor, said program code when executed, causing said first graphics adapter to render first and second images within said first adapter memory;

causing transfer of said second images from said first adapter memory to a frame buffer of said second graphics adapter; and causing said second display interface of said second graphics adapter to be programmed to display said second images from said frame buffer of said second graphics adapter on said second display.

15. The computing device of claim 14, further comprising a first command queue for queuing commands to be executed by said first graphics adapter, and wherein said causing transfer of said second images from said first adapter memory comprises placing a command in said first command queue to block transfer said second images to said frame buffer of said second adapter.

16. The computing device of claim 15, further comprising a second command queue for queuing commands to be executed by said second graphics adapter, and wherein said causing transfer comprises placing a command in said second command queue to block transfer said second images to said frame buffer of said second adapter.

17. The computing device of claim 15, wherein causing said second display interface of said second graphics adapter to be programmed, comprises placing a command in said second command queue for execution by said second adapter.

18. The computing device of claim 14, wherein said second display interface comprises a programmable RAMDAC.

19. The computing device of claim 14, wherein said first adapter is formed on a peripheral expansion card of said computing device.

20. The computing device of claim 14, wherein said high speed bus comprises a PCI express compliant bus.

21. The computing device of claim 19, wherein said second adapter is integrated as part of an interface circuit interconnecting said processor with said high speed expansion bus.

* * * * *